(12) United States Patent
Lim

(10) Patent No.: US 8,709,626 B2
(45) Date of Patent: Apr. 29, 2014

(54) APPARATUS FOR PREVENTING OVERCHARGE OF A BATTERY

(75) Inventor: Hae Kyu Lim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 135 days.

(21) Appl. No.: 13/323,678

(22) Filed: Dec. 12, 2011

(65) Prior Publication Data

US 2013/0075242 A1    Mar. 28, 2013

(30) Foreign Application Priority Data

Sep. 26, 2011  (KR) .................. 10-2011-0096709

(51) Int. Cl.
*H01M 2/00*    (2006.01)

(52) U.S. Cl.
USPC .............................. 429/61; 429/156; 429/160

(58) Field of Classification Search
None
See application file for complete search history.

(56) References Cited

FOREIGN PATENT DOCUMENTS

| KR | 10-0878702 | | 6/2007 | |
|---|---|---|---|---|
| KR | 10-2009-0043717 | * | 5/2009 | .............. H01M 2/10 |
| KR | 10-2009-0043717 A | | 5/2009 | |

OTHER PUBLICATIONS

Lee et al. (KR 10-1046192) (a raw machine translation).*

* cited by examiner

*Primary Examiner* — Patrick Ryan
*Assistant Examiner* — Carmen Lyles-Irving
(74) *Attorney, Agent, or Firm* — Edwards Wildman Palmer LLP; Peter F. Corless

(57) ABSTRACT

Disclosed is an apparatus for preventing overcharging of a battery. More specifically, a cell module in which cells are configured to be stacked and a plurality of cells are connected through electrode terminals and a fixing rod disposed between the cells is provided. A pressure plate, which is installed on the fixing rod to provide the appropriate reactive force, and an elastic member disposed on the side of the second end of the pressure plate is installed to provide elastic force to the pressure plate. The pressure plate is see-sawingly-rotated when the cell is expanded over a predetermined pressure accordingly to cut-off the power to the battery when the pressure within the battery exceeds the predetermined threshold.

6 Claims, 3 Drawing Sheets

APPARATUS FOR PREVENTING OVERCHARGE OF A BATTERY

CROSS-REFERENCE TO RELATED APPLICATION

This application claims under 35 U.S.C. §119(a) the benefit of Korean Patent Application No. 10-2011-0096709 filed on Sep. 26, 2011, the entire contents of which are incorporated herein by reference.

BACKGROUND (a) Technical Field

The present invention relates to an apparatus for preventing overcharge of a battery in which power to the battery is blocked when the battery is over-charged.

(b) Background Art

In general, electric vehicles, hybrid vehicles or fuel cell vehicles use high-voltage batteries to supply electrical energy for powering these types vehicles. High-voltage batteries consist of a battery pack to produce high-voltage by connecting a plurality of unit cells or modules and therethrough generates high power using the high-voltage battery.

Battery packs are often stacked to provide higher density so they can be used in rectangular type or pouch type cells and the like having low individual capacity. Unit cells (battery cells) of the battery pack are often lithium ion cells that provide high power at a low capacity.

However, the lithium ion cells are often unsafe in vehicular implementations. That is, in particular in the pouch type cells, the mechanical strength of the cell case is low and when a sealing part/gasket is separated, leakage of flammable material such as electrolyte may be emitted and thus increases the risk of fire.

In particular, since the electrolyte is injected into the inside of the cell, when the battery is over-charged, the voltage rises and the electrolyte inside is more rapidly decomposed due to overheating which generates flammable gases as a result. Accordingly, the risk of fire and explosion of the battery are increased due to a swelling phenomenon of the pouch itself.

In this regard, when the swelling phenomenon occurs due to overcharging of the battery, a technology for blocking power of the battery by force has been proposed. FIG. 1 illustrates prior art for blocking battery power in which expansion stress is concentrated in a connection part of the battery cell 1 or electrode terminal 2 of a unit module, when expanding due to the swelling of the battery cell 1 occurs. In this case, a portion of the connection part is configured to include a weak structure in terms of volume expansion so that when swelling is equal to or greater than a predetermined value, a short circuit may occur when the portion of the connection part of the electrode terminal 2 bursts.

However, since the connection part of the electrode terminal is configured to include a weak structure, the connection part of the electrode terminal can burst due to unexpected physical force or vibration and the like as well as expansion operation of the battery cell due to weakening of durability.

SUMMARY OF THE DISCLOSURE

The present invention provides an apparatus for preventing overcharge of a battery by blocking power to the battery to improve stability of the battery through an organizational structure when the battery is over-charged. More specifically, a cell module in which cells are configured to be stacked and a plurality of cells are connected through electrode terminals is provided, and a fixing rod is disposed between the cells. A pressure plate is installed on the fixing rod, in which the one end is located to be adjacent to the connection part of the electrode terminal and the cell and the other end is located on a center part of the cell to separate the connection of the electrode terminal and the cell by see-saw-rotating around the fixing rod when the cell is expanded. An elastic member is provided on the other end side of the pressure plate to provide elastic force to the pressure plate so that the pressure plate is see-saw-rotated when the cell is expanded above a predetermined pressure.

In yet another embodiment, the apparatus is configured such that a plurality of cells are arranged to face each other, a first end and a second end of the electrode terminal are connected to second and first ends respectively of the adjacent cells respectively, the fixing rod is installed between the cells and the pressure plates are installed on both sides of the fixing rod to be see-saw-rotated respectively, such that one end of one side of each of the pressure plates are adjacent to the connection part of the cell and the first end and the second end of the electrode terminal respectively. The elastic member may be installed between the two pressure plates, accordingly.

In some embodiments, first end of the pressure plate may be formed by bending the end toward the connection of the cell and the electrode terminal. Additionally, the second end of the pressure plate may be formed by bending the end toward the cell to which expanded pressure is applied.

In another further embodiment, two cells may be arranged to face each other, the first and second ends of the electrode terminal are connected to the adjacent cells respectively, and the first and second ends of the electrode terminal are connected to the second and first ends of the adjacent cells respectively. Furthermore, the fixing rod, the pressure plate and the elastic member may be installed to be each faced outward on any one side of two sides around the center of the cell.

Additionally, the two cells may arranged to face each other, the first and second ends of the electrode terminal are connected to one of the ends of the adjacent cells respectively, the ends of the electrode terminal may be connected to the other ends of the adjacent cells respectively as well. Again, the fixing rod, the pressure plate and the elastic member may be installed on any one side of two sides around the center of the cell.

In some embodiments, the elastic member may be a spring.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
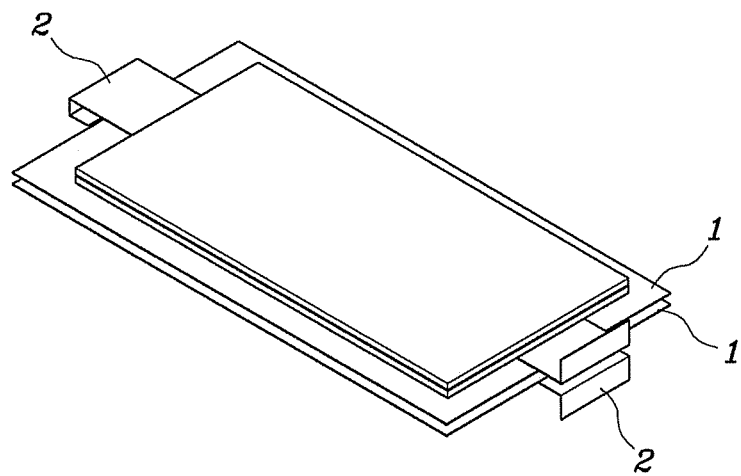
FIG. 1 is a view illustrating a configuration of an apparatus for shutting off power when a battery is over-charged according to the conventional art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

According to the present invention, an apparatus for preventing a battery from being overcharged is configured to include a cell module 10, a fixing rod 20, a pressure plate 30 and an elastic member 40.

Figure 2:
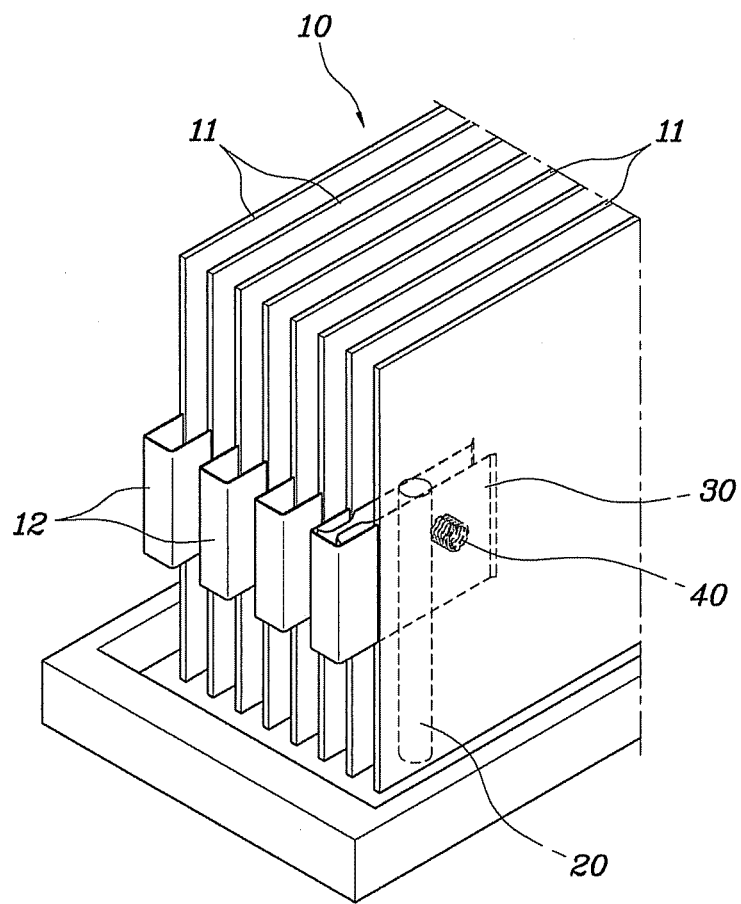
FIG. 2 is a perspective view illustrating a configuration of an apparatus for preventing overcharge of a battery according to the exemplary embodiment of the present invention.
Figure 3:
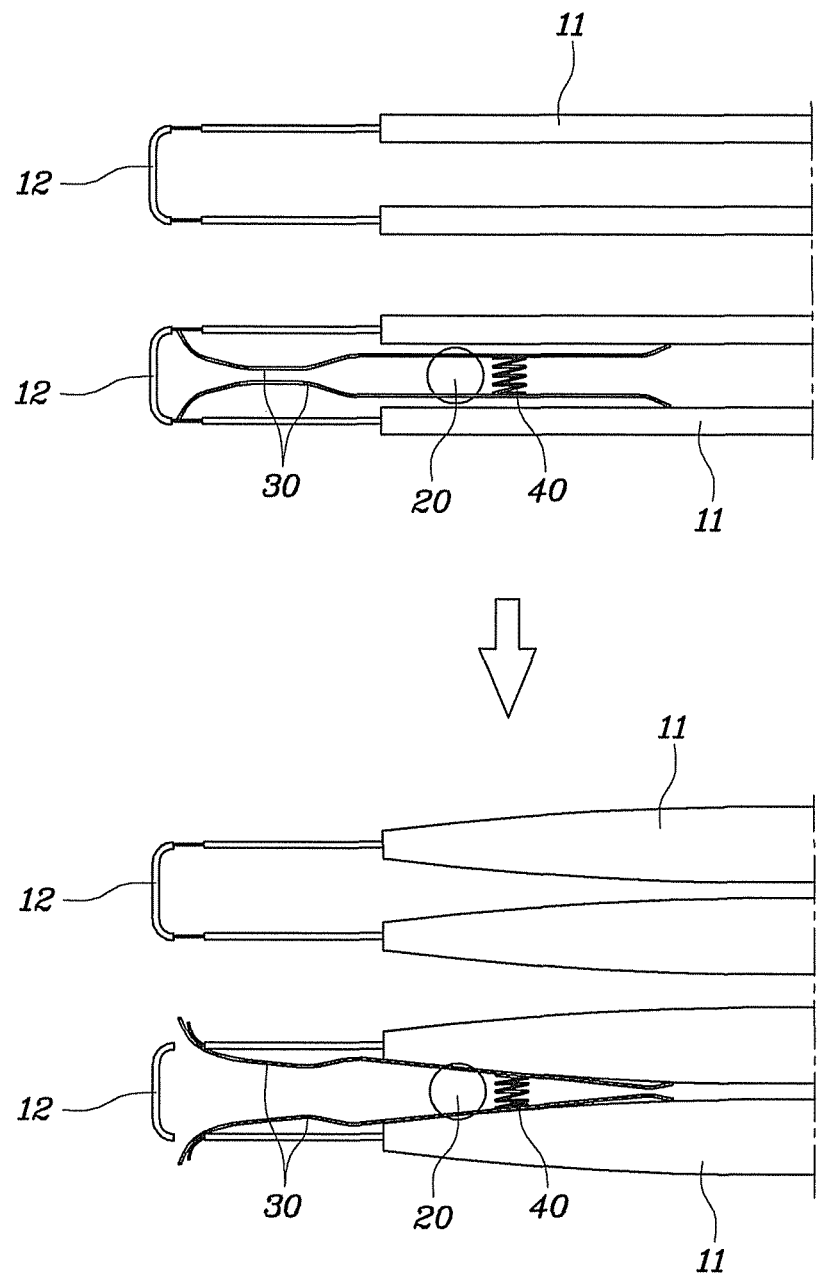
FIG. 3 is a schematic diagram illustrating an operating state of an apparatus for preventing overcharge of a battery according to the exemplary embodiment of the present invention.
Figure 4:
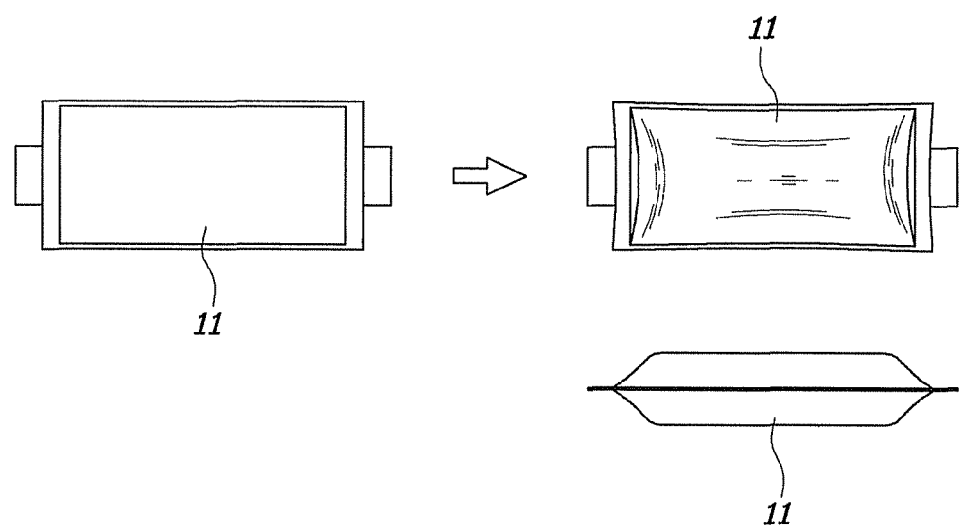
FIG. 4 is a view illustrating states of individual cells before and after expansion according to the exemplary embodiment of the present invention.

Referring to FIGS. 2 to 4, the apparatus is configured to include: a cell module 10 in which cells 11 are configured to be stacked and a plurality of cells 11 are connected through an electrode terminal 12. A fixing rod 20 is provided between the cells 11, and a pressure plate 30, which is installed on the fixing rod 20, in which the one end is located to be adjacent to the connection part of the electrode terminal 12 and the cell 11 and the other end is located on the center part of the cell 11 to separate the connection of the electrode terminal 12 and the cell 11 by see-saw-rotating around the fixing rod 20 when the cell 11 is expanded. Furthermore, an elastic member 40 is provided on the side of the other end of the pressure plate 30 to provide elastic force to the pressure plate 30 so that the pressure plate 30 is see-saw-rotated when the cell 11 is expanded above a predetermined pressure.

That is, when the cells 11 are expanded due to overcharging of the battery, the other end of the pressure plate 30 is compressed by the expansion pressure of the cell 11 so that the pressure plate 30 is see-saw-rotated around the fixing rod 20. Accordingly, since the one end of the pressure plate 30 presses the connection part of the cell 11 and the electrode terminal 12, the connection part is cut off so that power of the battery can be shut off accordingly.

Herein, the outside of the cell module 10 is provided with a cell module housing (the housing is omitted) to cover the cell module 10 and a plurality of cell modules 10 may be connected to each other to configure the battery pack.

Meanwhile, as shown in FIG. 3, the apparatus for preventing overcharge of the battery may be configured with a plurality of pressure plates 30 which are installed between the two cells 11. Preferably, the plurality of cells 11 are disposed to face each other, a first end and a second end of the electrode terminal 12 are connected to the opposing ends of the respective cells 11 respectively and the fixing rod is installed between the two cells 11. In addition, the pressure plates 30 are installed on the both sides of the fixing rod 20 to be see-saw-rotated respectively so that the sides of the first ends of the respective pressure plates 30 are adjacent to each of the connection parts of the cell 11 and both ends of the electrode terminal 12. Further, the elastic member 40 is installed between two pressure plates 30, as well to provide a uniform elastic force against the pressure plates 30.

By see-saw rotation it is meant that the pressure plates act much like a lever which has been placed on a fulcrum. Thus, when one end of the pressure plate applies force in one direction, the opposing end of the pressure plate applies a force in the opposing direction.

That is, the fixing rod 20 is installed between two cells 11, the pressure plates 30 are installed on the both sides around the center of the fixing rod 20 respectively, and the pressure plate 30 is see-sawingly-moved so that the both ends are in contact with the center part of the cell 11 and the connection part of the cell 11 and the electrode terminal 12 around the center of the fixing rod 20. Further, the elastic member 40 is installed between the two pressure plates 30.

Accordingly, when the cell 11 is expanded, the one of the ends of the pressure plates 30 located between two cells 11 are depressed so as to be focused in the same direction as each other and the pressure plates 30 are see-saw-rotated around the center of the fixing rod 20. As a result, the opposing ends of the pressure plates 30 adjacent to the power terminal are extended in the direction opposite to each other send and opposing ends of the pressure plates 30 are pressed so as to come into contact with the connection part of cell 11 and both ends of the electrode terminal 12 respectively. Thus, since at least any one of the connection parts of the cell 11 and both ends of the electrode terminal 12 is cut off, power of the battery may be shut off.

In addition, the one end (first end) of the pressure plate 30 may be formed by bending the end toward the connection part of the cell 11 and the electrode terminal 12. That is, the end of the pressure plate 30, which is pressed onto the connection part of the cell 11 and the electrode terminal 12, is formed by bending the end closer to a vertical portion of the connection part and accordingly, the connection part of the cell 11 and the electrode terminal 12 can be more easily pressed.

In addition, the other end of the pressure plate 30 may be formed by bending the other end (second end) toward the cell 11 to which expanded pressure is applied. That is, the other end (second end) of the pressure plate 30 compressed by expansion pressure from the cell 11 is formed by bending the second end toward the cell 11. Accordingly, the other end of the pressure plate 30 is stably maintained to be in contact with the surface of the cell 11, and when the cell 11 is expanded, a force due to leverage is more clearly transmitted to the one end side of the pressure plate 30 to improve the reliability of cutting off the connection part of the cell 11 and the electrode terminal 12.

In addition, the two cells 11 may be arranged to face each other, the first and second ends of the electrode terminal 12 may be connected to the first ends of the respective cells 11 respectively, the first and second ends of the electrode terminal 12 are connected to the other ends of the respective cells 11 respectively, and the fixing rod 20, the pressure plate 30 and the elastic member 40 are installed on any one side or both sides of the cell 11 in relation to a center portion thereof.

That is, the electrode terminal 12 may connected to the both sides of the two cells 11 respectively and the pressure plate 30 may be installed on the both sides or on at least one side of the both sides of the cell 11 so that when the cell 11 is expanded due to overcharge, the pressure plate 30 functions as a lever and at least any one of the connection parts of the cell 11 and the two electrode terminals 12 are disconnected thereby. Accordingly, the risk of fire and explosions is prevented by cutting off power of the battery.

In addition, the elastic member 40 can be embodied as a spring, but any other elastic member having elasticity the same as or similar to the spring can be used as well.

Advantageously, since the elastic member 40 is installed between two pressure plates 30, when the cell 11 is expanded to a pressure which is less than a predetermined pressure, the see-saw rotation of the pressure plate 30 is not performed when the resistance due to elasticity of the spring is greater than the expansion pressure of the cell 11.

However, when the cell 11 is expanded above the predetermined pressure, since the expansion pressure of the cell 11 is greater than the resistance of the spring, the see-saw rotation of the pressure plate 30 is activated. Herein, the predetermined pressure may be pressure which requires that the battery be cut-off due to expansion of the cell 11.

Accordingly, when the cell 11 is expanded at relatively low expansion pressure, the shut-off of the electrode terminal 12 is not performed, but when the cell 11 is expanded at relatively large expansion pressure to an extent that the cut-off of the battery power is required, the electrode terminal 12 is cut-off, so that the reliability of the organizational structure for preventing overcharge of the battery can be more effectively improved.

Furthermore, when the cells are expanded due to overcharging of the battery, the pressure plate is see-saw-rotated around the center of the fixing rod. In this case, since the one end of the pressure plate presses on the connection part of the cell and the electrode terminal, the connection part is cut off so that power to the battery may be shut off. Therefore, since explosion and fire of the battery is prevented due to overcharging of the battery, the safety performance of the battery may be enhanced.

In addition, since the pressure plate can be installed on both sides of the cell respectively, at least any one of the connection parts of the cell and the electrode terminal of the both sides is cut off so that the shut-off operation of the battery can be effectively achieved.

Further, since elastic force is provided to the pressure plate so that the pressure plate is see-saw-rotated only when the cell is expanded over a predetermined pressure through the elastic member, the reliability of an organizational structure for preventing overcharge of the battery is improved.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An apparatus for preventing overcharge of a battery, comprising:
    a cell module in which cells are stacked and a plurality of cells are connected through a plurality of electrode terminals that are connected electrically and mechanically to the plurality of cells;
    a fixing rod disposed between the cells;
    a plurality of pressure plates, at least one of which is installed on the fixing rod, in which a first end is located to be adjacent to the connection part of an electrode terminal of the plurality of electrode terminals and the cell and a second end is located on the center part of the cell to separate the connection of the electrode terminal and the cell by see-saw-rotating around the fixing rod when the cell is expanded; and
    an elastic member disposed on a side of the second end of the pressure plate to provide elastic force to the pressure plate, wherein the pressure plate is see-saw-rotated when the cell is expanded over a predetermined pressure,
    wherein the plurality of cells are arranged to face each other, a first end and a second end of the electrode terminal are connected to ends of the respective cells respectively, the plurality of pressure plates are installed on opposite sides of the fixing rod to be rotatable in a see-saw-rotated manner respectively, wherein sides of first ends of the pressure plates are adjacent to the connection part of the cell and first end and second end of the electrode terminal respectively, and the elastic member is installed between two pressure plates of the plurality of pressure plates.

2. The apparatus of claim 1, wherein the first end of the pressure plate is formed by bending the first end toward the connection of the cell and the electrode terminal.

3. The apparatus of claim 1, wherein the second end of the pressure plate is formed by bending second end toward the cell to which expanded pressure is applied.

4. The apparatus of claim 1, wherein the two cells are arranged to face each other, the first and second ends of the electrode terminal are connected to the first ends of the respective cells respectively, the first and second ends of the electrode terminal are connected to the second ends of the respective cells respectively, and the fixing rod, the pressure plate and the elastic member are installed to face each other on two sides of a center portion of the cell.

5. The apparatus of claim 1, wherein the two cells are arranged to face each other, the first and second ends of the electrode terminal are connected to first ends of the respective cells respectively, the first and second ends of the electrode terminal are connected to the second ends of the respective cells respectively, and the fixing rod, the pressure plate and the elastic member are installed on any one side of two sides of the cell at or around the center thereof.

6. The apparatus of claim 1, wherein the elastic member is a spring.

* * * * *